United States Patent
Kim (10) Patent No.: US 8,645,707 B2
(45) Date of Patent: Feb. 4, 2014

(54) APPARATUS AND METHOD FOR UNLOCKING A USER EQUIPMENT

(75) Inventor: Jeong-Ho Kim, Gyeonggi-do (KR)

(73) Assignee: KY Corporation, Gyeonggi-do (KR)

( * ) Notice: Subject to any disclaimer, the term of this patent is extended or adjusted under 35 U.S.C. 154(b) by 44 days.

(21) Appl. No.: 13/235,697

(22) Filed: Sep. 19, 2011

(65) Prior Publication Data

US 2012/0167202 A1 Jun. 28, 2012

(30) Foreign Application Priority Data

Dec. 28, 2010 (KR) ................. 10-2010-0136376

(51) Int. Cl.
*G06F 21/00* (2013.01)
*G06F 7/04* (2006.01)
*G06F 1/26* (2006.01)

(52) U.S. Cl.
USPC ............. 713/183; 713/184; 726/27; 726/28; 726/34

(58) Field of Classification Search
USPC .................. 726/19, 27, 28, 34; 713/183, 184
See application file for complete search history.

(56) References Cited

U.S. PATENT DOCUMENTS

| 7,562,227 | B1 * | 7/2009 | Cox et al. ................ 713/183 |
| 7,653,818 | B2 * | 1/2010 | Serpa ..................... 713/184 |
| 2007/0236330 | A1 * | 10/2007 | Cho et al. ................ 340/5.54 |
| 2010/0009658 | A1 * | 1/2010 | Wu et al. ................. 455/411 |
| 2010/0180336 | A1 * | 7/2010 | Jones et al. .............. 726/19 |
| 2011/0302649 | A1 * | 12/2011 | Foster et al. ............. 726/19 |
| 2012/0120013 | A1 * | 5/2012 | Kurz .................... 345/173 |

FOREIGN PATENT DOCUMENTS

KR 10-2008-0090802 A 10/2008

* cited by examiner

*Primary Examiner* — Mohammad W Reza
(74) *Attorney, Agent, or Firm* — IP Legal Services, LLC (57) ABSTRACT

An apparatus and method for unlocking a user equipment. The apparatus may include a first input unit, a second input unit, a controller, and a memory. The first input unit may be configured to set up a first password and to receive a first input. The second input unit may be configured to set up a second password and to receive a second input. The controller may be configured to compare the first input with the first password, compare the second input with the second password, and initiate an unlock operation of the user equipment based on a result of the comparisons. The memory may be configured to store at least the first password and the second password.

21 Claims, 5 Drawing Sheets

APPARATUS AND METHOD FOR UNLOCKING A USER EQUIPMENT

CROSS REFERENCE TO PRIOR APPLICATIONS

The present application claims priority under 35 U.S.C. §119 to Korean Patent Application No. 10-2010-0136376 (filed on Dec. 28, 2010), which is hereby incorporated by reference in its entirety.

FIELD OF THE INVENTION

Apparatuses and methods consistent with the present invention relate to a security function of a user equipment, and more particularly, to unlocking a locked state of a user equipment using an unlock password configured as a combination of a keypad password and a motion password.

BACKGROUND OF THE INVENTION

A user equipment has been advanced to perform multiple functions such as communicating with others, exchanging personal information, accessing Internet banking, and electronic payments as well as capturing images, playback of music/video files, playing games, receiving a broadcasting signal, and storing personal information. Lately, such a multifunctional user equipment has been receiving greater attention.

Since the user equipment provides various functions requiring personal information such as electronic payments and accessing Internet banking, there have been many methods introduced for strengthening a security of the user equipment. The most popular security method may be using a password. For example, a user may set up a password configured of four digits of numbers or characters. After a user equipment enters a locked state, the user must enter the password using a keypad of the user equipment to unlock the user equipment.

However, such a method may not be secure enough to protect personal information stored in a user equipment because the password might be easily revealed to others. Accordingly, there is a need for improvements in the way of protecting personal information stored in the user equipment from others.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a user may set up an unlock password configured of a keypad password and a motion password and having a password input sequence and unlock the user equipment using the unlock password.

In accordance with another aspect of the present invention, a user may unlock a user equipment from a locked state when a keypad input is matched with a keypad password, a motion input is matched with a motion password, and the keypad input and the motion input are input according to a password input sequence.

In accordance with an embodiment of the present invention, a method for unlocking a user equipment may include receiving an unlock request for unlocking or releasing a lock state of the user equipment, activating at least a first input unit and a second input unit, entering a first input and a second input through the first input unit and the second input unit, determining whether or not the combination of the first input and the second input is matched with an unlock password, and unlocking the user equipment when the combination of the first input and the second input is matched with the unlock password.

Prior to receiving the unlock request, the unlock password may be set up and stored. The unlock password may include a first password and a second password. The setting up and storing the unlock password may include inputting the first password through the first input unit of the user equipment, inputting the second password through the second input unit of the user equipment, selecting a password input sequence or input time condition of the first and second passwords, and storing the first password, the second password, and the selected password input sequence or time condition in a memory of the user equipment.

The first input unit may include a keypad. The keypad may be integrated with a touch screen of the user equipment. The second input unit may receive or detect the second input by using at least one of a camera, a microphone, a sensor, function buttons, and the keypad.

The first password may include at least one of a sequence of numbers, characters, symbols, a pattern drawn on a keypad of the user equipment, and a combination thereof. The second password may include at least one of a motion, gesture and sound input through the second input unit of the user equipment.

The second input unit may receive or detect the second input by using at least one of a camera, a microphone, a sensor, function buttons, and a keypad of the user equipment. The selected password input sequence may include a sequence of entering the first password and the second password concurrently. Alternatively, the selected password input sequence may include a sequence of sequentially entering the first password and the second password with an interval therebetween.

The user equipment may be unlocked when the first input is matched with the first password, the second input is matched with the second password, and a sequence in which the first and second inputs are entered is matched with the selected password input sequence.

In accordance with another embodiment of the present invention, a method for unlocking a user equipment may including inputting or receiving an unlock request for unlocking the user equipment from a locked state, activating a keypad and input units of the user equipment, receiving a keypad input and a motion input through a keypad input unit and a motion input unit, and determining whether the keypad input and the motion input are matched with a keypad password and a motion password stored in the user equipment. The motion input may include at least one of a motion, gesture, and sound. The user equipment may be unlocked when the keypad input is matched with the keypad password, the motion input is matched with the motion password, and the keypad input and the motion input are entered concurrently.

In accordance with still another embodiment of the present invention. An apparatus in a locked state may be unlocked. The apparatus may include a first input unit, a second input unit, a controller, and a memory. The first input unit may be configured to set up a first password and to receive a first input. The second input unit may be configured to set up a second password and to receive a second input. The controller may be configured to compare the first input with the first password, compare the second input with the second password, and initiate an unlock operation of the user equipment based on a result of the comparisons. The memory may be configured to store any or all of the first password, the second password, programs and data related to the unlock operation of the controller.

The first password may include at least one of a sequence of numbers, characters, symbols, a pattern drawn on a keypad of the user equipment, and a combination thereof, and the second password may include at least one of a motion, gesture and sound input through the second input unit of the user equipment.

The controller may initiate the unlock operation of the user equipment when the first password is matched with the first input, the second password is matched with the second input, and the first input and the second input are entered concurrently.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Reference will now be made in detail to embodiments of the present invention, examples of which are illustrated in the accompanying drawings, wherein like reference numerals refer to like elements throughout. The embodiments are described below, in order to explain the present invention by referring to the figures.

Figure 1:
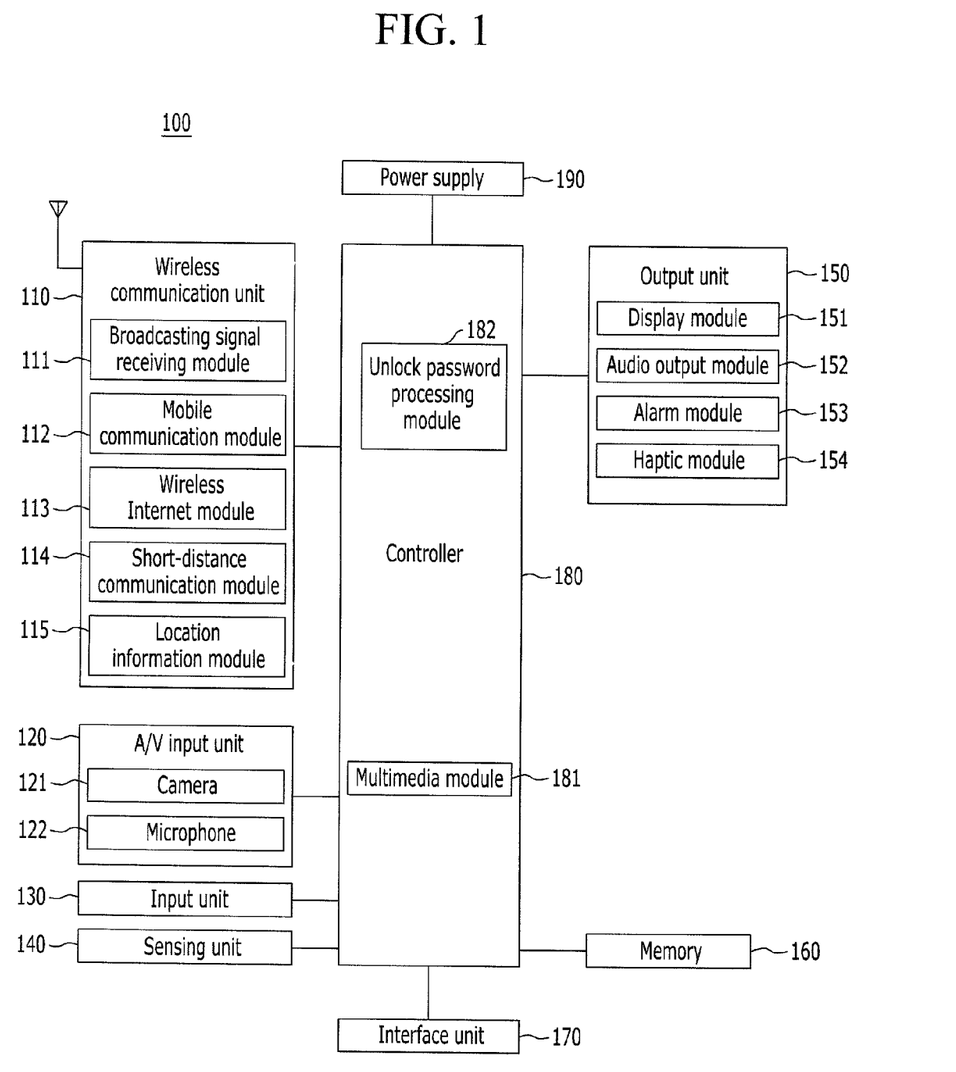
FIG. 1 illustrates a user equipment in accordance with an embodiment of the present invention.
Figure 2:
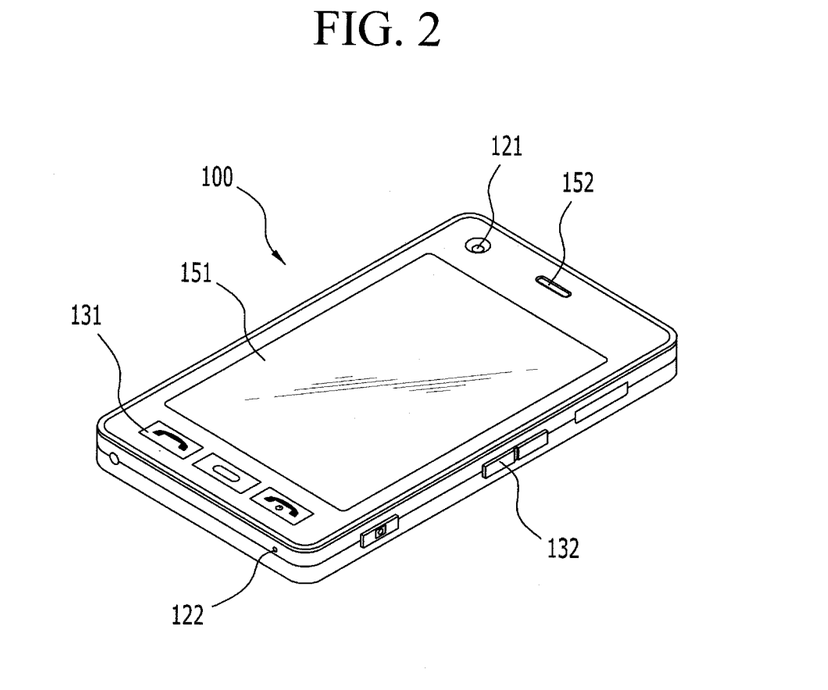
FIG. 2 illustrates an exterior view of a user equipment, in accordance with an embodiment of the present invention.

FIG. 1 illustrates a user equipment in accordance with an embodiment of the present invention, and FIG. 2 illustrates an exterior view of a user equipment in accordance with an embodiment of the present invention.

In accordance with an embodiment of the present invention, a user equipment may be unlocked using an unlock password configured as a combination of a keypad password and a motion password and having a password input sequence. Such an unlock password may be set up by a user. In order to set up the unlock password, a user equipment may include a keypad to set up a keypad password and to receive keypad inputs from the user. The user equipment may further include various types of input units to set up a motion password and to receive motion inputs from a user. Hereinafter, such a user equipment in accordance with embodiments of the present invention will be described in detail.

Referring to FIG. 1 and FIG. 2, the user equipment 100 may include a wireless communication unit 110, an audio/video (A/V) input unit 120, an input unit 130, a sensing unit 140, an output unit 150, a memory 160, an interface unit 170, a controller 180, and a power supply 190.

The wireless communication unit 110 may include at least one module for wireless communication between the user equipment 100 and a wireless communication system or between the user equipment 100 and a network in the vicinity of the user equipment 100. For example, the wireless communication unit 110 may include any or all of a broadcasting signal receiving module 111, a mobile communication module 112, a wireless Internet module 113, a short-distance communication module 114, and a location information module 115.

The broadcasting signal receiving module 111 may receive a broadcasting signal and/or broadcasting related information from an external source such as a broadcasting management server through a broadcasting channel. The broadcasting channel may be a satellite channel or a terrestrial channel. The broadcasting management server may be a server that is provided with a broadcasting signal and/or broadcasting related information and may transmit the broadcasting signal and/or broadcasting related information to user equipments. The broadcasting signal may include any or all of a TV broadcasting signal, a radio broadcasting signal, and a data broadcasting signal. The broadcasting related information may be information related to a broadcasting channel, a broadcasting program, or a broadcasting service provider. The broadcasting related information may be provided through a mobile communication network. In accordance with an embodiment of the present invention, the broadcasting related information may be received through the mobile communication module 112. The broadcasting related information may have various types of formats. For example, the broadcasting related information may have a format of an Electronic Program Guide (EPG) of the Digital Multimedia Broadcasting (DMB) or an Electronic Service Guide (ESG) of the Digital Video Broadcast-Handheld (DVB-H).

The broadcasting signal receiving module 111 may receive a broadcasting signal from any of various broadcasting systems. For example, the broadcasting receiving module 111 may use a Digital Multimedia Broadcasting-Terrestrial (DMB-T) system, a Digital Multimedia Broadcasting-Satellite (DMB-S) system, a Media Forward Link Only (Media FLO) system, a Digital Video Broadcast-Handheld (DVB-H) system, and/or an Integrated Services Digital Broadcast-Terrestrial (ISDB-T) system. The broadcasting signal receiving module 111 may be configured to receive a broadcasting signal from other systems as well as from the above described digital broadcasting systems. The broadcasting signal receiving module 111 may store broadcasting signals and/or broadcasting related information in the memory 160.

The mobile communication module 112 may receive a wireless signal from and/or transmit a wireless signal to at least one of base stations, user equipments, and servers in a mobile communication network. The wireless signal may include data in various formats according to a type of the wireless signal, such as a voice call signal, a video call signal, a text message, and a multimedia message.

The wireless Internet module 113 may be a module for wirelessly accessing the Internet. The wireless Internet module 113 may be internally included in the user equipment 100 or externally coupled to the user equipment 100. The wireless Internet module 113 may support various types of technologies for accessing the Internet, such as Wireless Local Area Network (WLA/V), Wi-Fi, Wireless broadband (WiBro), World Interoperability for Microwave Access (WiMax), and High Speed Downlink Packet Access (HSDPA), but is not limited thereto.

The short-distance communication module 114 may be a module for a short-distance communication. The short-distance communication module 114 may support related technologies, for example, Bluetooth, Radio Frequency Identification (RFID), Infrared Data Association (IrDA), Ultra Wideband (UWB), ZigBee, and Near Field Communication (NFC), but is not limited thereto.

The location information module 115 may be a module for finding a location of the user equipment 100 and providing information related to the location thereof. The location information module 115 may be a global positioning system (GPS), but is not limited thereto. For example, the location information module 115 may provide three dimensional location data of a location of the user equipment 100, such as latitude, longitude, and altitude of the user equipment 100. Such information may be calculated using various methods. For example, the location information module 115 may calculate distances from three different satellites to the user equipment 100 and times of measuring distances and calculates a location of the user equipment by applying triangulation on the calculated distances and times. For another example, the location information module 115 may calculate location and time information using three satellites and calibrate the location and time information using another satellite. The location information module 115 may constantly calculate a current location of the user equipment 100 in real-time and calculate a speed of the user equipment 100 based on the calculated locations. In accordance with an embodiment of the present invention, the location information module 115 may be used to perform a map searching function.

The A/V input unit 120 may receive an audio signal and/or a video signal. The A/V input unit 120 may include a camera 121 and a microphone 122.

The camera 121 may process image frames of a still image or a moving image, which are captured by an image sensor in a video call mode or a photographing mode. The processed image frame may be displayed on a display module of the user equipment 100 through a display module 151 of the output unit 150. The image frames captured from the camera 121 may be stored in the memory 160 or transmitted to an external device through the wireless communication unit 110. In accordance with an embodiment of the present invention, the user equipment 100 may include a plurality of cameras. In accordance with an embodiment of the present invention, the camera 121 may be used to set up a motion password and/or to receive a motion input. For example, a motion of covering a lens of the camera 121 at least for a specific time may be received through the camera 121 as a motion password or as a motion input.

The microphone 122 may receive an audio signal provided externally in an on-call mode, a recording mode, or a voice recognition mode. In the case of the on-call mode, audio data may be converted to a data format that can be transmitted to a mobile communication base station through the mobile communication module 112. The microphone 122 may be implemented with various noise filtering algorithms for eliminating noises generated in the background during the receiving of the external audio signals. In accordance with an embodiment of the present invention, the microphone 122 may be used to set up a motion password and/or to receive a motion input. For example, a speaking of at least one specific word may be received through the microphone 122 as a motion password or as a motion input.

The input unit 130 may be a user interface for receiving input from a user. Such an input unit 130 may be realized as various types. For example, the input unit 130 may include any of a keypad, a touch pad, a jog wheel, and a jog switch, but is not limited thereto. The input unit 130 may include at least one operation unit for inputting commands in order to control the operation of the user equipment 100. For example, the input unit 130 may include a call start button 131 and a volume control button 132, as illustrated in FIG. 2. Particularly, user equipments may include a touch screen as a display module in order to satisfy demands of expanding a display screen, making better use of a space, and improving design. When a user equipment employs a touch screen, the input unit 130 may be integrally realized with the display module 151. For example, the input unit 130 may be realized as a soft key type input unit on a display module of the user equipment 100.

The sensing unit 140 may detect a current status of the user equipment 100. For example, the sensing unit 140 may sense an opening or closing of a cover of the user equipment 100, a location and a bearing of the user equipment 100, acceleration and deceleration of the user equipment 100, or physical contact with or proximity to a user. Based on the detected status of the user equipment 100, the sensing unit 140 may generate a sensing signal to control the operations of the user equipment 100. For example, in the case of a mobile phone having a sliding type cover, the sensing unit 140 may sense whether a cover is opened or closed. The sensing unit 140 may sense whether or not the power supply 190 supplies power or whether or not the interface unit 170 is coupled to an external device.

The output unit 150 may generate visual outputs, audio outputs, and/or haptic outputs. The output unit 150 may include a display module 151, an audio output module 152, an alarm module 153, and a haptic module 154.

The display module 151 may output information processed by the user equipment 100. For example, in the case of an on-call mode, the display module 151 may display a user interface (UI) or a graphical user interface (GUI) according to a type of a call. In the case of a video call mode or a photographing mode, the display module 151 may display a UI or a GUI related to received video or display captured image or video. The display module 151 may be a liquid crystal display (LCD), a thin film transistor LCD (TFT LCD), an organic light emitting diode (OLED), a flexible display, or a 3D display, but is not limited thereto. In accordance with an embodiment of the present invention, the user equipment 100 may include a plurality of display modules. For example, a plurality of display modules may be disposed on one side of the user equipment 100 with a gap between adjacent display modules or without a gap. Additionally, a plurality of display modules may be disposed on different sides of the user equipment 100.

The user equipment 100 may employ a touch screen to form the display module 151. The touch screen may have a layered structure formed of a display module and a touch sensor disposed over or under the display module. Accordingly, the display module 151 may be used not only as an output device but also as an input device when the touch screen is employed as a component of the display module 151. In accordance with an embodiment of the present invention, a keypad password may be set up using a keypad. Such a keypad may be provided as a hardware unit disposed on the user equipment 100 or may be a graphical user interface displayed on the touch screen of the display module 151.

The touch sensor may be in a form of a touch film, a touch sheet, or a touch pad. The touch sensor may convert pressure applied to a specific part of the display module 151 and capacitance variation formed around a specific part of the display module 151 in accordance with an electric input signal. The touch sensor may detect pressure and/or a directivity of a touch input as well as a location and/or an area of a touch input made on a touch sensor. When the touch sensor senses a touch input, the touch sensor may transmit a corresponding signal to a touch controller. The touch controller may process the signal from the touch sensor and transmit corresponding data to the controller 180. Accordingly, the controller 180 can be aware of which part of a display module has been touched.

A proximity sensor may be disposed in an internal area surrounded by the touch screen or disposed near, around, or throughout the touch screen. The proximity sensor is a sensor that may detect an object without a physical contact. For example, the proximity sensor may detect an object approaching a sensing side of the proximity sensor or detect an object located in the vicinity of the proximity sensor using an electromagnetic field or infrared rays. The proximity sensor may have a longer lifespan and higher utilization degree than that of a contact-type sensor. For example, the proximity sensor may be a through-beam photoelectric sensor, a retro-reflective photoelectric sensor, a capacitive proximity sensor, or a magnetic proximity sensor, but is not limited thereto. A capacitive touch screen may be configured to detect an approaching pointer based on electromagnetic variation that may be caused by the pointer approaching the touch screen. Such a capacitive touch screen (touch sensor) may be classified as a type of proximity sensor.

The proximity sensor may sense a proximity touch and/or a proximity touch pattern, for example, a proximity touch distance, a proximity touch direction, a proximity touch speed, a proximity touch time, a proximity touch location, and/or a proximity touch movement state. Information on proximity touch inputs or proximity touch patterns may be displayed on a touch screen.

The audio output module 152 may output audio data stored in the memory 160 or received from the wireless communication unit 110 in an on-call mode, in a recording mode, in a voice recognition mode, and/or in a broadcasting receiving mode. The audio output module 152 may output an audio signal corresponding to functions performed by the user equipment 100. For example, the audio output module 152 may output a call-signal receiving sound or a message receiving sound. Such an audio output module 152 may include a speaker.

The alarm module 153 may output a signal in order to inform a user of event generation in the user equipment 100. For example, the user equipment 100 may generate events such as call signal reception, message reception, key signal input, and/or touch input. The alarm module 153 may output various types of signals such as a video signal, an audio signal, and/or a vibration signal in order to inform a user of the event generation. The video signal and the audio signal may be output through the display module 151 and the audio output module 152 respectively. Furthermore, in accordance with an embodiment of the present invention, the user equipment 100 may include a plurality of audio output modules.

The haptic module 154 may generate various types of haptic effects that a user may sense. Particularly, the haptic module 154 may generate vibration. The haptic module 154 may control strength or pattern of vibration. For example, the haptic module 154 may output a vibration effect having different types of vibrations combined together or may output different types of vibrations sequentially. Instead of vibration, the haptic module 154 may generate various types of other effects. For example, the haptic module 154 may generate an effect that stimulates a skin of a user by controlling a pin array with each pin independently moving vertically. The haptic module 154 may generate an effect that stimulates a skin of a user by controlling an air outlet to spray out a burst of air to a user or by controlling an air inlet to intake air from around a user. Furthermore, the haptic module 154 may generate an electrostatic force, a cold sensation, or a warm sensation to stimulate a user.

The haptic module 154 may transfer a haptic effect through direct physical contact or through a muscle sense of a finger or an arm of a user. In accordance with an embodiment of the present invention, the user equipment 100 may include a plurality of haptic modules.

The memory 160 may store programs for operations of the controller 180 and input/output data. For example, the memory 160 may store various data such as contact lists, e-mails, messages, pictures, video files, various vibration patterns and effect sounds in response to a touch input made on the touch screen. In accordance with an embodiment of the present invention, any or all of an unlock password configured as a combination of a keypad password, a motion password and a program for performing a setup procedure and a program for performing an unlocking procedure may be stored in the memory 160.

The memory 160 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto. In accordance with an embodiment of the present invention, the user equipment 100 may interact with a web-based storage that performs the storage function of the memory 160.

The interface unit 170 may include a communication path between the user equipment 100 and an external device or devices coupled to the user equipment 100. The interface unit 170 may receive data or power from an external device, transfer the data to a constituent element of the user equipment 100 or transfer internal data of the user equipment 100 to an external device. For example, the interface unit 170 may include a wired/wireless headset port, an external power charger port, a wired/wireless data port, a memory card port, an identification module connection port, an audio I/O port, a video I/O port, and/or an earphone port. The identification module may be a chip for storing various types of information for authenticating a user right of the user equipment 100. The identification module may include a User Identify Module (UIM), a Subscriber Identity Module (SIM), and/or a Universal Subscriber Identity Module (USIM). A device having the identification module may be manufactured in the form of a smart card. Such a device may be coupled to the user equipment 100 through the identification module connection port.

The interface unit 170 may include a path for receiving power from a cradle or dock when the user equipment 100 is coupled to an external cradle or dock. The interface unit 170 may include a path for transferring command signals input to the cradle or dock by a user to the user equipment 100. A command signal or power input from the cradle or dock may operate as a signal that indicates to a user whether or not the user equipment 100 is accurately or firmly connected to the cradle or dock.

The controller 180 may control an overall operation of the user equipment 100. For example, the controller 180 may control and process a voice call, a text message, and a video call. The controller 180 may include a multimedia module 181 for reproducing multimedia data. The multimedia module 181 may be realized integrally with the controller 180 or independently from the controller 180 as an independent unit. The controller 180 may recognize a touch input made on the touch screen. For example, the controller 180 may process patterns of touch inputs made on the touch screen. Based on the processed patterns, the controller 180 may recognize a character or a symbol input through a touch screen. The controller 180 may include an unlock password processing module 182. The unlock password processing module 182 may control operations related to a setup procedure for setting up a keypad password and/or a motion password having a password input sequence and an unlock procedure for unlocking a user equipment.

The unlock password processing module 182 may receive keypad inputs and motion inputs from a user. The unlock password processing module 182 may compare the received keypad input and motion input with a keypad password and a motion password stored in the memory 160. When the received keypad input and motion input are matched with the keypad password and motion password stored in the memory 160, the unlock password processing module 182 may determine whether or not the keypad input and the motion input are entered in a manner or sequence specified by a password input sequence stored in the memory 160. When the keypad input and the motion input are entered correctly as specified by the password input sequence, the unlock password processing module 182 may perform operations related to unlocking the user equipment 100.

The power supply 190 may supply power for operating constituent elements in response to the controller 180. For example, the power supply 190 may receive power from an internal power source or from an external power source.

In accordance with an embodiment of the present invention, a user may unlock a user equipment using an unlock password configured as a combination of a keypad password and a motion password and having a password input sequence. The keypad password may be a sequence of numbers, letters, symbols, or a combination thereof. Also, the keypad password may be a pattern drawn on a keypad or other input device. The motion password may be a specific motion interacting with input units such as the camera 121 or the microphone 122. The unlock password in accordance with an embodiment of the present invention may be configured of the keypad password and the motion password and having a password input sequence. For example, the unlock password may be a sequence of numbers such as '1, 2, 3, 4' with a motion of covering a lens of a camera for five seconds. After a user equipment enters a locked state, a user must enter an unlock password such as entering the keypad password with the motion password at the same time in order to unlock the user equipment. Hereinafter, a method for unlocking a user equipment using an unlock password, in accordance with an embodiment of the present invention, will be described with reference to FIG. 3.

Figure 3:
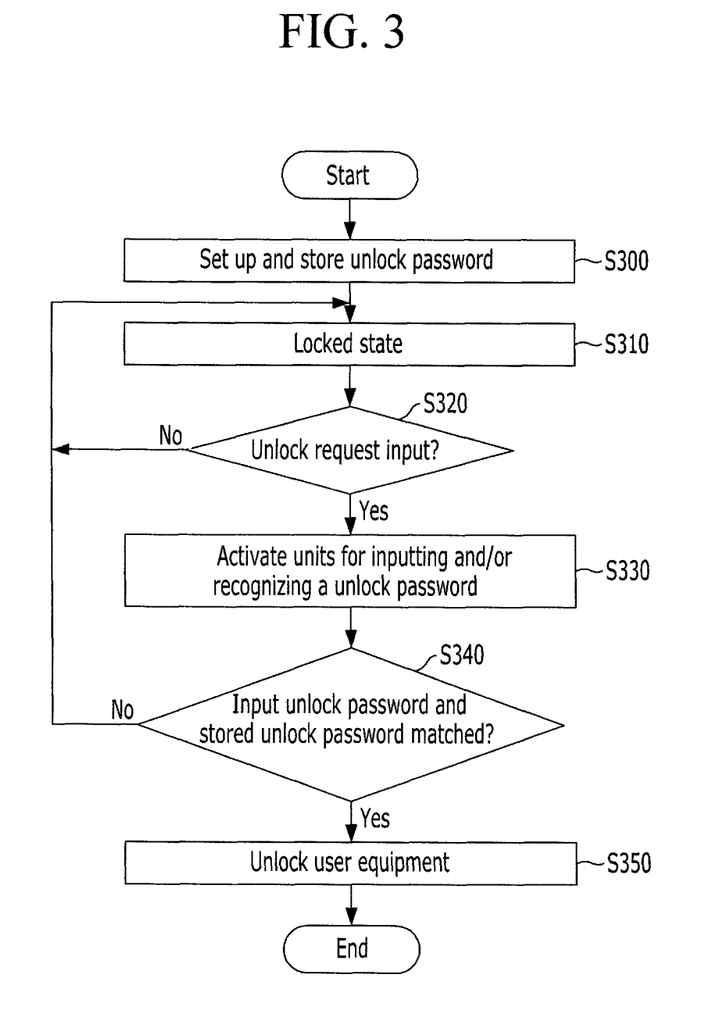
FIG. 3 illustrates a method for unlocking a user equipment using an unlock password configured as a combination of a keypad password and a motion password, in accordance with an embodiment of the present invention.

FIG. 3 illustrates a method for unlocking a user equipment, in accordance with an embodiment of the present invention.

Referring to FIG. 3, the method may include an unlock password setup mode and an unlock mode. In the unlock password setup mode, an unlock password may be set up and stored S300. For example, a user may set up a keypad password and a motion password having a password input sequence as the unlock password using a keypad and/or other input units of a user equipment. After setting up the unlock password, the unlock password may be stored in a memory of the user equipment.

After storing the unlock password, a user equipment may enter into a locked state S310. For example, the user equipment may entered a locked state under various conditions. Particularly, the user equipment may enter a locked state when the user equipment has not been used for a period of time, for example, for about five minutes.

When a signal is input to the user equipment during the locked state of the user equipment, the unlock mode may be initiated. In the unlock mode, a determination may be made as to whether or not an unlock request is inputted S320. For example, a user may press any one or combination of the key buttons of a user equipment as the unlock request to invoke an unlock procedure of a user equipment that is in the locked state.

When the unlock request is inputted (S320-YES), related units for inputting and/or recognizing the unlock password may be activated S330. For example, input units such as a keypad, a camera, and a microphone may be activated, and a user may enter a keypad input and a motion input through the activated input units.

A determination may be made as to whether or not the received keypad and motion inputs and the input sequence, that is, the order in which the inputs were received, are matched with the stored unlock password S340. For example, the received keypad and motion inputs and the input sequence may be compared with the unlock password stored in the memory.

When the keypad and motions inputs and the input sequence are matched with the stored unlock password (S340-YES), the user equipment may be unlocked S350. When not matched (S340-NO), the user equipment may maintain the user equipment in the locked state S310.

Figure 4:
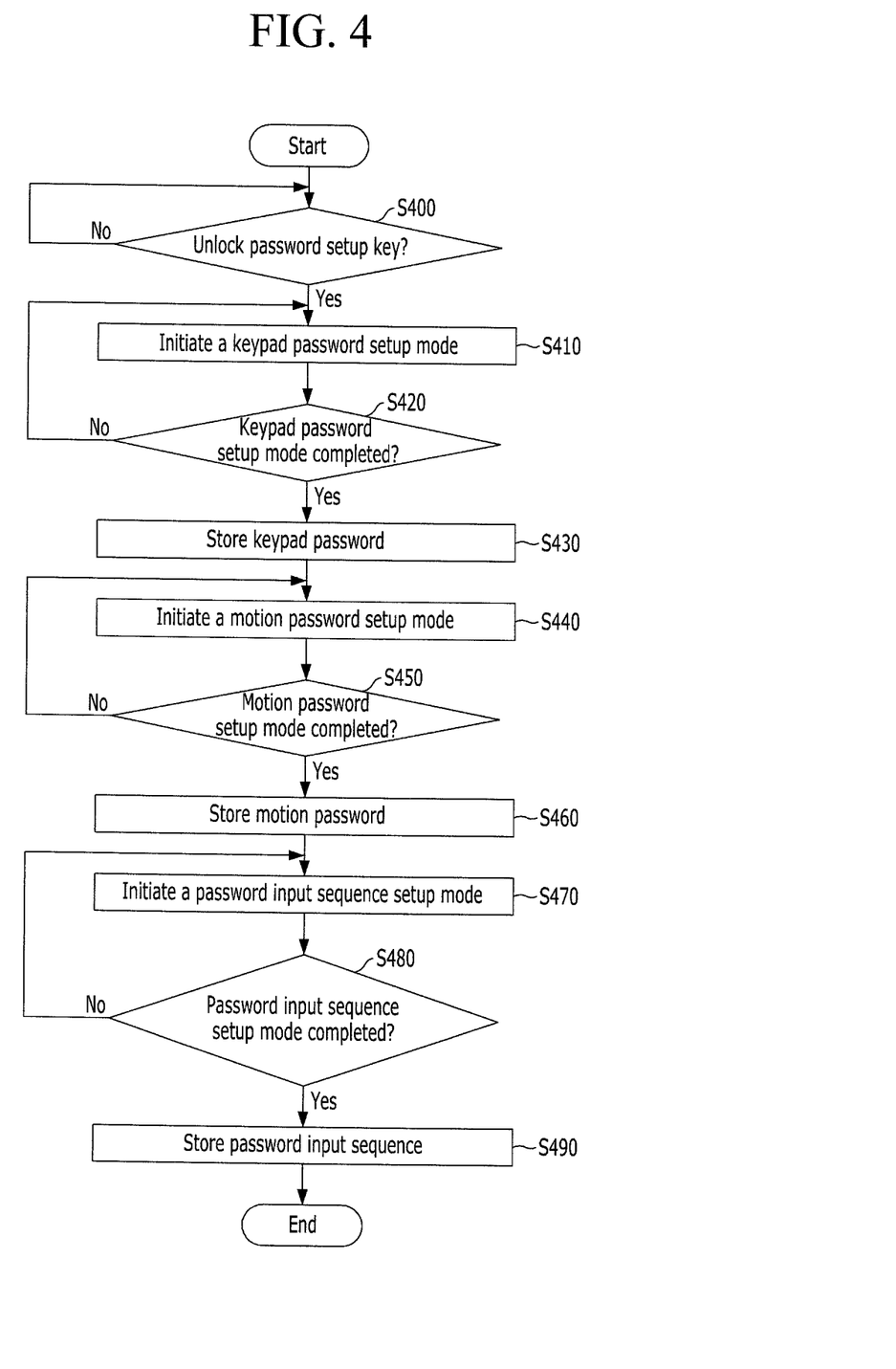
FIG. 4 illustrates a method of setting up an unlocking password, in accordance with an embodiment of the present invention.

FIG. 4 illustrates a method of setting up an unlock password in accordance with an embodiment of the present invention. The unlock password setup mode may be for setting up an unlock password configured as a combination of a keypad password and a motion password.

As described above, a user may use an unlock password configured as combination of a keypad password and a motion password having a password input sequence to unlock a user equipment, in accordance with an embodiment of the present invention. The user may set up such an unlock password in the unlock password setup mode. The unlock password setup mode may include a keypad password setup mode, a motion password setup mode, and a password input sequence setup mode. The unlock password setup mode may be initiated by a control signal input from a user.

The unlock password setup mode of FIG. 4 is described as including the keypad password setup mode, the motion password setup mode, and the password input sequence setup mode. However, the present invention is not limited thereto, and in accordance with an embodiment of the present invention, the unlock password setup mode may include only the keypad password setup mode and the motion password setup mode. Furthermore, a sequence of performing the keypad password setup mode, the motion password setup mode, and the password input sequence setup mode may be varied in accordance with other embodiments of the present invention.

Referring to FIG. 4 a determination may be made as to whether or not an unlock password setup key is activated S400. For example, the unlock password setup mode may be initiated in response to an unlock password setup signal. The unlock password setup signal may be generated by pressing an unlock password setup key. The unlock password setup key may be one or more key buttons disposed on the user equipment 100.

When the unlock password setup key is input (S400-YES), a keypad password set up mode may be initiated S410. In the keypad password setup mode, a user may setup a keypad password using a keypad or other input device. The keypad password may be a sequence of numbers, a sequence of characters, a sequence of symbols, or a sequence of a combination of numbers, characters and/or symbols. Furthermore, the keypad may be a pattern drawn on the keypad or other input device. The keypad may be a hardware unit disposed on the user equipment 100 or be a graphical user interface displayed on a touch screen of the user equipment 100.

For example, a window may be displayed on the display module 151 when the keypad password setup mode is initiated. A user may input a sequence of numbers, characters, symbols, or any combination thereof using the keypad. For example, a user may input a sequence of numbers '1, 2, 3, 4,' as the keypad password. A user may input a sequence of characters 'a, b, c, d' or a sequence of a combination of numbers and characters '1, a, 2, c' as the keypad password. Furthermore a user may draw a pattern formed in a shape of "T" or "L" using the keypad.

After inputting the sequence of numbers, characters, symbols, or combination thereof, a user may confirm the entered sequence of numbers, characters, symbols, or combination thereof displayed on the window. After confirmation, a determination may be made as to whether or not the keypad password setup mode is completed S420. For example, a user may press a keypad password setup completion button to end the keypad password setup mode.

When the keypad password setup mode is completed (S420-YES), the entered keypad inputs may be stored in the memory 160 as the keypad password S430.

After storing, a motion password setup mode may be initiated S440. For example, available motion password types may be displayed on the display module 151. A user may select one of the displayed motion password types. For example, the motion password types may be a motion of covering a lens of the camera 121 for at least a duration of time, a motion of pushing a volume control button of the user equipment 100 for at least a duration of time, or a speaking of at least one specific word through the microphone 122. Such motions may be input to the user equipment 100 using various input units such as a microphone, a camera, and key buttons.

After selecting a motion password type, a user may set up detailed motions for the selected motion password type. For example, after selecting a motion of covering a lens of the camera 121, a user may cover the lens for about five seconds to complete setting up of the selected motion password type. When a user selects a motion of pushing a volume control button of the user equipment 100, a user may push and hold the volume control button for five seconds to set up details of the selected motion password type.

After the user sets up the details of the selected motion password type, the selected motion password type and the details thereof may be displayed on the display module 151. A user may confirm the selected motion password based on the displayed information. When a user wants to reselect or re-input a motion password, a user may set up the motion password again by restarting the motion password setup mode S440.

After confirming the selected motion password, a determination may be made as to whether or not a motion password setup mode is completed S450. For example, a user may press a motion password setup completion button when the user completes set up of the motion password. When the motion password setup mode is completed (S450-YES), the selected motion password type with the details thereof may be stored in the memory 160 as the motion password S460.

After setting up the motion password, a password input sequence setup mode may be initiated S470. The password input sequence setup mode may set up a password input sequence, such as a sequence of inputting the keypad password and the motion password and/or an interval between the keypad password and the motion password. For example, the password input sequence may be set up as inputting the keypad password and the motion password at the same time or as sequentially inputting the keypad password and the motion password with an interval of two seconds. For example, a password input sequence may be set up as simultaneously making a motion of covering a lens of a camera and inputting a keypad password of "1, 2, 3, 4" using the keypad.

After setting up the password input sequence, a determination may be made as to whether or not the password input sequence setup mode is completed S480. When the password input sequence setup mode is completed (S480-YES), the password input sequence may be stored in the memory 160 along with the keypad password and the motion password S490. Accordingly, the unlock password configured as a combination of the keypad password and the motion password having the password input sequence is set up, which completes the unlock password setup mode. Such an unlock password may be used to unlock a user equipment from a locked state. Hereinafter, the unlock mode will be described with reference to FIG. 5.

Figure 5:
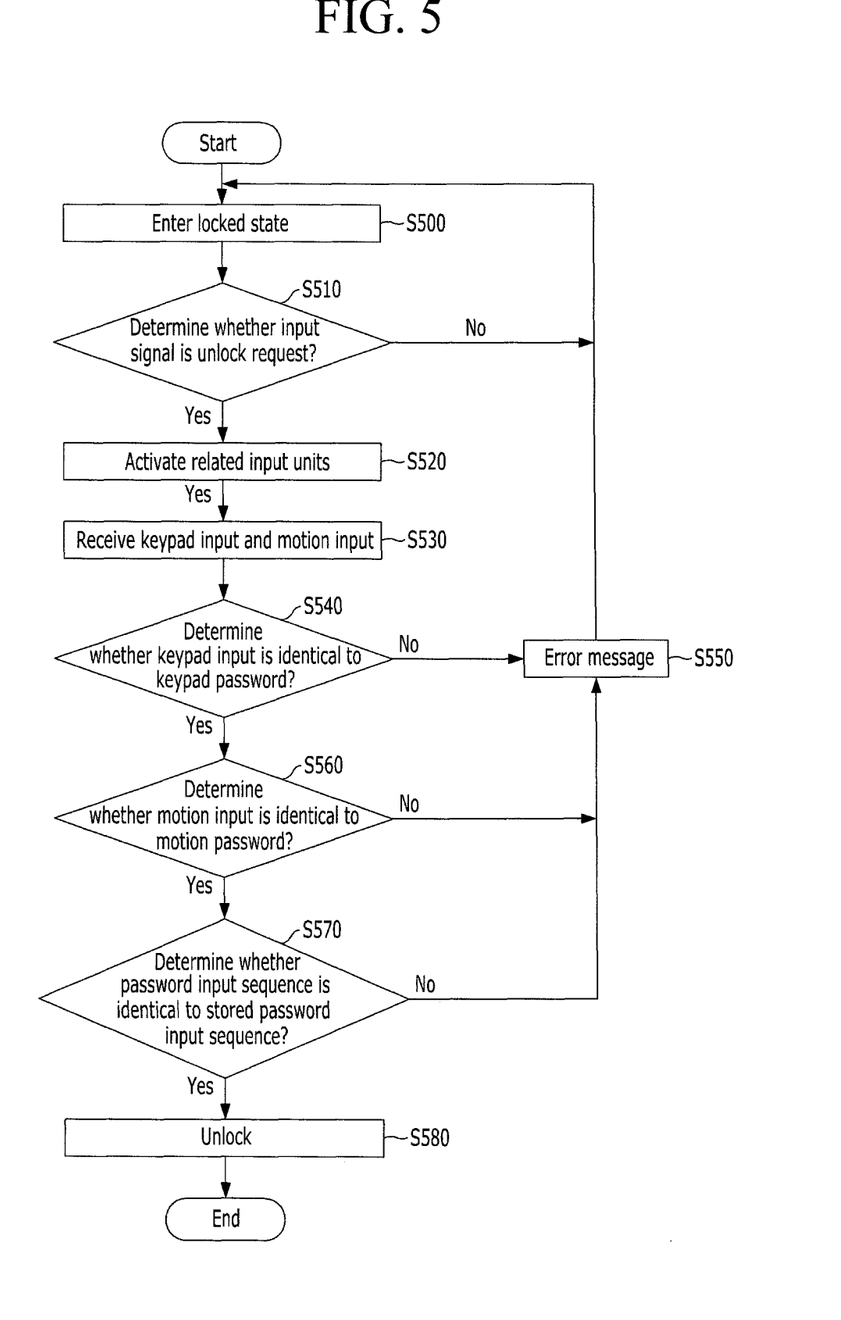
FIG. 5 illustrates a method of unlocking a user equipment from a locked state using an unlocking password, in accordance with an embodiment of the present invention.

FIG. 5 illustrates a method of unlocking a user equipment, in accordance with an embodiment of the present invention.

Referring to FIG. 5, a user equipment may enter into a locked state S500. Particularly, the user equipment may enter a locked state when the user equipment has not been used for a period of time, for example, for about five minutes. This period of time may be set to be any duration as desired by a user.

When a signal is input to the user equipment during the locked state, a determination may be made as to whether or not the input signal is an unlock request S510. For example, a user may click any button, combination of buttons, or a dedicated button of a user equipment to generate the unlock request. Furthermore, a shaking or vibration of a user equipment may generate the unlock request. The unlock request may be input through various ways, and is not limited to the above-described methods.

When the input signal is determined to be the unlock request (S510-YES), a unit or units related to an unlock password may be activated S520. For example, when a user generates the unlock request, units for inputting and recognizing a keypad input and a motion input may be activated. Units to be activated may be determined based on the unlock password stored in the memory 160. Particularly, units related to a motion password may be activated. When a motion password is a motion of covering a camera lens for three seconds and a keypad password is a four digit sequence of numbers '1, 2, 3, 4,' the keypad and the camera 121 may be activated. The motion of covering a camera lens for three seconds may be detected using a light sensor included in the camera 121. The light sensor may sense a quantity of light entering through the camera lens. However, in accordance with an embodiment of the present invention, other units may be activated along with the units related to the unlock password.

After activating the related input units, a keypad input and a motion input may be received through the activated input units S530. For example, a user may input a sequence of numbers '1, 2, 3, 4,' and also make a motion of covering a camera lens for three seconds. The user may input the keypad input and the motion input at the same time or at an interval.

After receiving the keypad input and the motion input, a determination may be made as to whether or not the keypad input is matched with a keypad password stored in the memory 160 S540. For example, a keypad input of '1, 2, 3, 4' is compared with the keypad password stored in the memory 160.

When the keypad input is not identical to the stored keypad password (S540-NO), an error message may be provided to the user S550 and the user equipment may be placed into the locked state S500. For example, the error message may be a message informing the user that the unlock password and/or the keypad input is incorrect.

When the keypad input is identical to the keypad password stored in the memory 160 (S540-YES), a determination may be made as to whether or not the motion input is matched with a motion password stored in the memory 160 S560. For example, the motion input of covering the camera lens for three seconds may be compared with the motion password stored in the memory 160.

When the motion input is not identical to the stored motion password (S560-NO), an error message may be provided to the user S550 and the user equipment may be placed into the locked state S500. For example, the error message may be a message informing the user that the unlock password and/or the motion input is incorrect.

When the motion input is identical to the motion password stored in the memory 160 (S560-YES), a determination may be made as to whether or not the password input sequence is matched with a password input sequence stored in the memory 160 along with the keypad password and the motion password S570.

When the password input sequence is not identical to the stored password input sequence (S570-NO), an error message may be provided to a user S550 and the user equipment may be placed into the locked state S500. For example, the error message may be a message informing a user that the unlock password and/or the password input sequence is incorrect.

When the password input sequence is identical to the stored password input sequence (S570-YES), it is determined that the unlock password has correctly been entered and the user equipment may be unlocked S580.

The unlock mode of FIG. 5 has been described as including providing an error message to a user when one of the keypad input, the motion input, and the password input sequence is not matched S550. In accordance with an embodiment of the present invention, this message may be not be provided to a user. Returning the user equipment 100 to a locked state without providing such an error message may strengthen a security of the user equipment 100.

As described above, such an unlock password configured as a combination of a keypad password and a motion password having a password input sequence may improve a security function of the user equipment.

In accordance with embodiments of the present invention, the method for unlocking a user equipment may be realized as a program and stored in a computer-readable recording medium such as a CD-ROM, a RAM, a ROM, floppy disks, hard disks, magneto-optical disks, and the like. Since the process can be easily implemented by those skilled in the art to which the present invention pertains, further description will not be provided herein.

The term "coupled" has been used throughout to mean that elements may be either directly connected together or may be coupled through one or more intervening elements.

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for unlocking a user equipment, the method comprising:
   receiving an unlock request for unlocking the user equipment from a locked state;
   receiving a first input through a first input unit of the user equipment;
   receiving a second input through a second input unit of the user equipment;
   determining whether the first and second inputs and a sequence of entering the first and second inputs, which are received through two different input units, are matched with an unlock password; and
   unlocking the user equipment when the first and second inputs and the sequence of entering the first and second inputs are matched with the unlock password,
   wherein the unlock password comprises a motion password and the motion password includes at least one of a motion of covering a lens of a camera of the user equipment for a predetermined duration time, a motion of pushing at least one button of the user equipment for a predetermined duration time, and a speaking of at least one predetermined word through a microphone of the user equipment.

2. The method of claim 1, wherein prior to receiving the unlock request, the method further comprises setting up and storing the unlock password, wherein the unlock password comprises a first password and a second password, and
   wherein the setting up and storing the unlock password comprises:
   inputting the first password through the first input unit;
   inputting the second password through the second input unit;
   selecting a password input sequence of the first and second passwords; and
   storing the first password, the second password, and the selected password input sequence in a memory of the user equipment.

3. The method of claim 2, wherein the first input unit comprises a keypad.

4. The method of claim 3, wherein the keypad is integrated with a touch screen of the user equipment.

5. The method of claim 3, wherein the second input unit receives or detects the second input by using at least one of a camera, a microphone, a sensor, function buttons, and the keypad.

6. The method of claim 2, wherein the first password comprises at least one of a sequence of numbers, characters, symbols, a pattern drawn on a keypad of the user equipment, and a combination thereof.

7. The method of claim 6, wherein the second password comprises at least one of a motion, gesture, and sound input through the second input unit of the user equipment.

8. The method of claim 7, wherein the second input unit receives or detects the second input by using at least one of a camera, a microphone, a sensor, function buttons, and a keypad of the user equipment.

9. The method of claim 2, wherein the selected password input sequence comprises a sequence of entering the first password and the second password concurrently.

10. The method of claim 2, wherein the selected password input sequence comprises a sequence of sequentially entering the first password and the second password with an interval therebetween.

11. The method of claim 2, wherein the user equipment is unlocked when the first input is matched with the first password, the second input is matched with the second password, and a sequence in which the first and second inputs are entered is matched with the selected password input sequence.

12. A method for unlocking a user equipment, the method comprising:
receiving an unlock request for unlocking the user equipment from a locked state;
receiving a keypad input through a keypad input unit;
receiving a motion input through a motion input unit; and
determining whether the keypad input the motion input, and a sequence of entering the keypad and motion inputs are matched with a keypad password, a motion password, and a password input sequence of the keypad and motion passwords stored in the user equipment,
wherein the motion input comprises at least one of a motion of covering a lens of a camera of the user equipment for a predetermined duration time, a motion of pushing at least one button of the user equipment for a predetermined duration time, and a speaking of at least one predetermined word through a microphone of the user equipment.

13. The method of claim 12, wherein the keypad password comprises at least one of a sequence of numbers, characters, symbols, a pattern drawn on the keypad input unit, and a combination thereof.

14. The method of claim 12, wherein the motion password is received or detected by the motion input unit by using at least one of a camera, a microphone, a sensor, function buttons, and the keypad input unit.

15. The method of claim 12, wherein the user equipment is unlocked when the keypad input is matched with the keypad password, the motion input is matched with the motion password, and the keypad input and the motion input are entered concurrently.

16. An apparatus comprising:
a keypad input unit configured to set up a keypad password and to receive a keypad input;
a motion input unit configured to set up a motion password and to receive a motion input;
a controller configured to determine a password input sequence of the keypad and motion passwords, compare the keypad input with the keypad password, compare the motion input with the motion password, and initiate an unlock operation of a user equipment based on a result of the comparisons and an entry sequence of the keypad and second inputs; and
a memory configured to store at least the keypad password, the motion password, and the password input sequence of the keypad and motion passwords,
wherein the keypad input includes at least one of a sequence of numbers, characters, symbols, a pattern drawn on a keypad of the user equipment, and a combination thereof, and the motion input includes at least one of a motion of covering a lens of a camera of the user equipment for a predetermined duration time, a motion of pushing at least one button of the user equipment for a predetermined duration time, and a speaking of at least one predetermined word through a microphone of the user equipment.

17. The apparatus of claim 16, wherein the keypad input unit comprises a keypad.

18. The apparatus of claim 16, wherein the motion input unit receives or detects the motion input by using at least one of a camera, a microphone, a sensor, function buttons, and key buttons of the user equipment.

19. The apparatus of claim 16, wherein the keypad password comprises at least one of a sequence of numbers, characters, symbols, a pattern drawn on a keypad of the user equipment, and a combination thereof, and the motion password comprises at least one of a motion, gesture, and sound input through the motion input unit of the user equipment.

20. The apparatus of claim 16, wherein the controller initiates the unlock operation of the user equipment when the keypad password is matched with the keypad input, the motion password is matched with the motion input, and the keypad input and the motion input are entered concurrently.

21. The apparatus of claim 16, wherein the controller initiates the unlock operation of the user equipment when the keypad input is matched with the keypad password, the motion input is matched with the motion password, and the entry sequence of the keypad and motion inputs is matched with the password input sequence of the keypad and motion passwords.

* * * * *

UNITED STATES PATENT AND TRADEMARK OFFICE
CERTIFICATE OF CORRECTION

| | | |
|---|---|---|
| PATENT NO. | : 8,645,707 B2 | Page 1 of 1 |
| APPLICATION NO. | : 13/235697 | |
| DATED | : February 4, 2014 | |
| INVENTOR(S) | : Jeong-Ho Kim | |

It is certified that error appears in the above-identified patent and that said Letters Patent is hereby corrected as shown below:

Title page, item (73) Assignee: "KY Corporation" should be corrected to --KT Corporation--.

Signed and Sealed this
Twenty-seventh Day of May, 2014

Michelle K. Lee
*Deputy Director of the United States Patent and Trademark Office*